United States Patent [19]

Commins et al.

[11] Patent Number: 4,665,672

[45] Date of Patent: May 19, 1987

[54] ONE PIECE, NON-WELDED HOLDOWN

[75] Inventors: Alfred D. Commins, Danville; Tyrell T. Gilb, Berkeley; Karen W. Littleton, Daly City, all of Calif.

[73] Assignee: Simpson Strong-Tie Company, Inc., Alameda, Calif.

[21] Appl. No.: 714,616

[22] Filed: Mar. 20, 1985

[51] Int. Cl.⁴ .................. E04B 1/38; E02D 27/00
[52] U.S. Cl. .................. 52/295; 52/714; 52/702; 403/232.1; 403/190
[58] Field of Search ............ 52/702, 714, 295; 403/262, 232.1, 190

[56] References Cited

U.S. PATENT DOCUMENTS

| | | | |
|---|---|---|---|
| 224,083 | 7/1972 | Gilb | D8/233 |
| 478,163 | 7/1892 | Lehman | 403/232.1 |
| 666,918 | 1/1901 | Butz | 403/232.1 |
| 770,050 | 9/1904 | Dreyer | 403/190 |
| 828,488 | 8/1906 | Lanz | 403/232.1 |
| 874,514 | 12/1907 | Lindow | 403/190 |
| 2,911,690 | 11/1959 | Sanford | 403/232.1 |
| 3,752,512 | 8/1973 | Gilb | 403/232.1 |
| 4,067,168 | 1/1978 | Thurner | 52/714 |
| 4,192,118 | 3/1980 | Gilb | 52/714 |
| 4,218,856 | 8/1980 | Irwin | 403/232.1 |

FOREIGN PATENT DOCUMENTS 405840  2/1934  United Kingdom ............ 403/190

OTHER PUBLICATIONS

Teco 6 Rough Carpentry: Wood Framing Systems, Jun. 1972, p. 3.

Primary Examiner—John E. Murtagh
Assistant Examiner—Caroline D. Dennison
Attorney, Agent, or Firm—James R. Cypher

[57] ABSTRACT

A sheet metal wood-to-concrete structural holdown connector for joining a wood horizontal or upstanding frame member to a concrete foundation formed from a single piece of sheetmetal. The holdown includes a seat member formed with a bolt opening, side members and back members formed with one or more openings. At least two of the back openings are in registration for receipt of a bolt therethrough. A metal washer is attached to the seat member and is formed with an opening in registration with the seat opening.

17 Claims, 16 Drawing Figures

ONE PIECE, NON-WELDED HOLDOWN

BACKGROUND OF THE INVENTION

The present invention is a connector used in wood frame construction and most specifically relates to those devices known as holdowns. Holdowns, as the term is used in the building construction industry refer to those metal connectors which tie the wood framing studs to the concrete foundation. Holdowns are to be distinguished from mudsill anchors which connect only the wood mudsills to the concrete slab or foundation walls. Holdowns are necessary in areas subject to earthquakes, hurricanes and typhoons. The standard practice of simply nailing studs to the mudsill is inadequate to anchor the building to its foundation. Holdowns are connected to the studs by bolts and are attached to the foundation by bolts anchored in the concrete.

Prior to the present invention, all holdowns were constructed from heavy gauge metal, welded and then painted. The hand labor in the welding and painting operations made mass production slow and relatively costly. Examples of welded holdowns as presently used in the construction industry are shown in Simpson Strong-Tie Connectors for Wood Construction, January 1985, Catalog 85H-1, Page 7. The HD 2 and HD 5 holdowns are shown and discussed in Gilb, U.S. Pat. No. 4,192,118, granted Mar. 11, 1980 which patented the HDN series. The HD 9 is the subject of U.S. patent application, Gilb, Ser. No. 567,357 filed Dec. 29, 1983, now abandoned. The HD 6 is protected by U.S. Pat. No. Des. 224,083 granted July 4, 1972.

Another important aspect of the prior art holdowns is the fact that all of them are attached to threaded bolts in which the stand off distance between the underside of the seat and the top of the mudsill varies between $1\frac{1}{2}$ to 3 inches. This stand off distance results from a building code requirement which requires a distance of 7 bolt diameters from the center of the lowest bolt opening in the back of the holdown to the top of the mudsill. Since the holdown is constructed from heavy gauge metal, it is standard practice to reduce the weight of the holdown by either terminating the member at the seat or providing a depending foot below the seat to provide self jigging of the device for installation.

Finally, while all connector manufacturers make numerous connectors such as hangers, anchors and straps from galvanized sheet metal, none of them manufacture a holdown made from sheet metal. Thus, fabrication techniques and painting have added significantly to the cost of manufacture of the present heavy gauge welded and painted holdowns.

SUMMARY OF THE INVENTION

The gist of the present invention is the use of a single piece galvanized sheet metal member which can be attached to wood frame studs by bolts and to a concrete foundation by a threaded anchor bolt.

A primary feature of the new holdown is the fact that no welding is required to construct the device. Instead, the holdown can be manufactured with existing high speed metal fabricating equipment.

Another feature is the fact that the holdown of the present invention need not be painted as all previous holdowns, thereby eliminating a slow and costly separate manufacturing step.

All forms of the invention have resulted in the ability to hold greater maximum loads and many forms have resulted in a savings in metal over comparable prior art holdowns.

Since the seat of the present holdown rests on or slightly above the mudsill, short anchor bolts can be used or embedment depths into the concrete foundation may be increased if bolt lengths used with prior art holdowns are maintained.

Because the holdown seat of the present invention rests on the mudsill, greater lateral loads may be attained because there is no longer an unsupported stand off distance between the seat and the mudsill. Such stand off distance resulted in bending of the prior art bolts under lateral stresses induced by laterally acting earthquakes and hurricanes.

A washer is attached to the holdown at the factory so that washers normally used with prior art devices will not become lost and the holdown cannot be inadvertently installed without the preattached washer.

Finally, a unique configuration of the sides of the lighter series of holdowns resulted in the ability to resist greater holdown loads.

DESCRIPTION OF THE PREFERRED EMBODIMENTS

Figure 1:
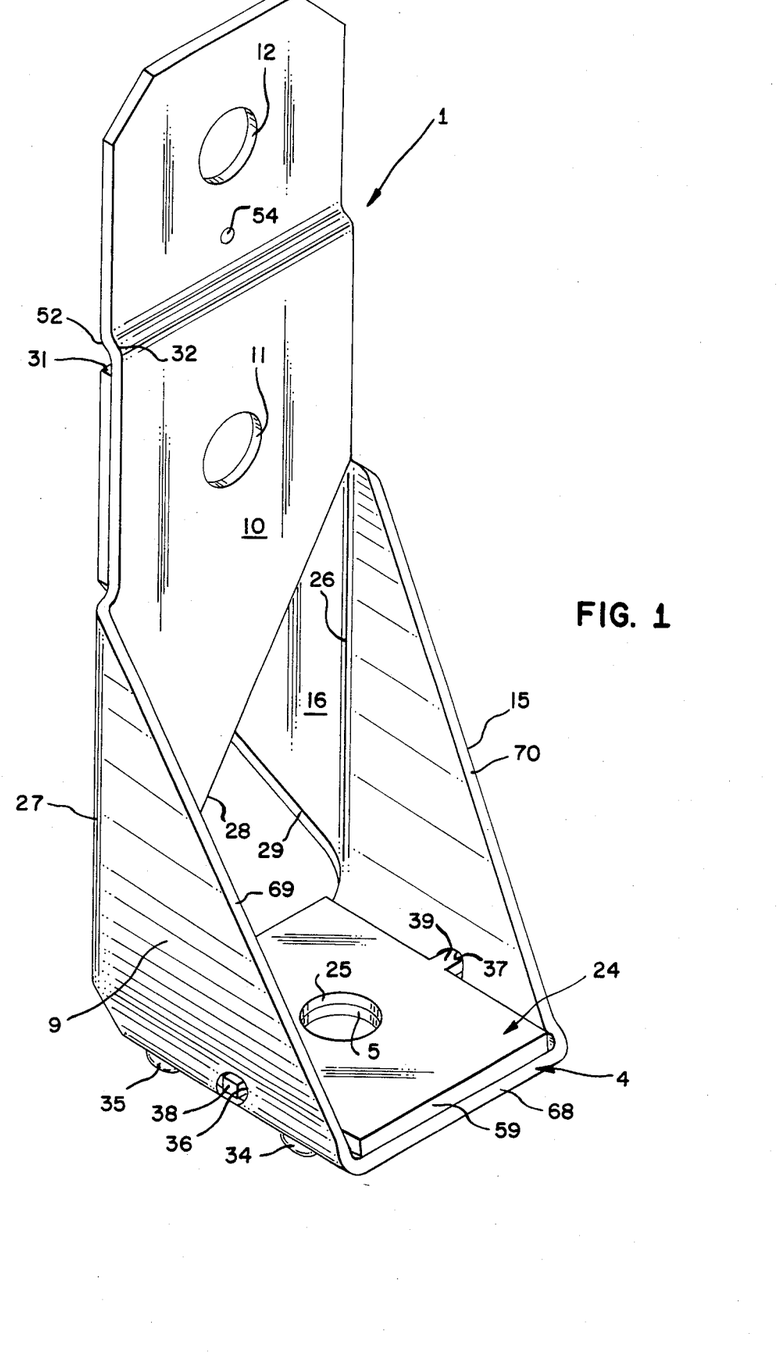
FIG. 1 is a perspective view of the holdown of the present invention.

The sheet metal wood-to-concrete structural holdown connector 1 of the present invention for joining a wood upstanding frame member 2 to a concrete foundation 3 (also referred to as a "remote building member") consists briefly of: a seat member 4 formed with an opening 5 adapted for receipt therethrough of an attachment member such as an anchor bolt or tension member 6 having a threaded end 7 and an angled embedded leg 8 anchored in the concrete foundation; a first side member 9 integrally connected to the seat member and forming a substantially right angle therewith; a first back member 10 integrally connected to the first side member and forming a substantially right angle therewith and formed with spaced openings 11 and 12 adapted for receipt therethrough of first and second attachment members 13 and 14 adapted for connection to the frame member; a second side member 15 integrally connected to the seat member and forming a substantially right angle therewith, and the second side member is substantially parallel to the first side member; and a second back member 16 integrally connected to the second side member and forming a substantially right angle therewith, and the second back member is generally parallel and closely adjacent to the first back member, and is formed with at least one opening 17 adapted for receiving one of the attachment members, and said opening in said second back member is in alignment with one of the openings in the first back member.

Anchor bolt 6 is provided with threaded nut 18 which is threadably received on the threaded end 7. Attachment members 13 and 14 are provided with threaded nuts 19 and 20 which are threadably received on threaded ends 21 and 22.

Figures 6, 7:
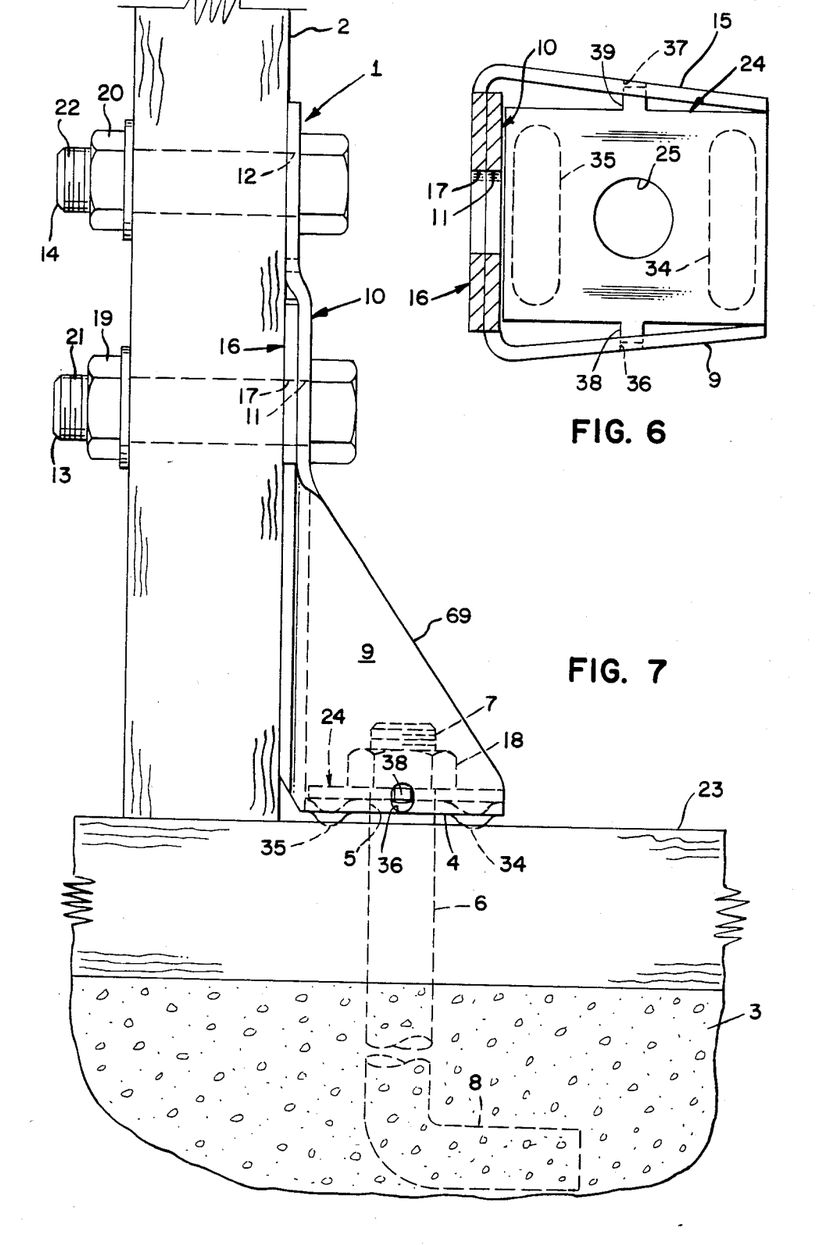
FIG. 6 is a cross sectional view of the holdown of FIG. 1 taken along line 6—6 of FIG. 2.
FIG. 7 is a side view of the connector of FIG. 1 in a typical installation bolted to a wood stud member and to a concrete foundation.

It is standard construction practice to anchor a mudsill 23 (also referred to as a compression structural member) to the concrete foundation by means of special mudsill anchors or threaded bolts (not shown) to provide a nailing strip for the studs. The lower ends of the vertical stud frame members 2 are generally attached to the mudsill by toenails. Even though the mudsill is securely anchored to the foundation by bolts or special anchors, the studs themselves are only lightly attached by toenails to the mudsill. Thus, in an earthquake or hurricane, the mudsill may stay firmly anchored to the foundation, while the remainder of the house including the studs lifts off the mudsill. For this reason, the holdowns of the present invention are required for areas subject to up lift or lateral forces such as earthquakes and hurricanes.

Preferably, the openings 11, 12 and 17 in the first and second back members are circular in shape and the attachment members such as bolts 13 and 14 are also circular in shape and are sized for close registration with the openings.

The seat member may have a generally rectangular shape having a front edge 68. Opening 5 in the seat is preferably circular for receipt therethrough of a round bolt 6.

Figures 8, 9:
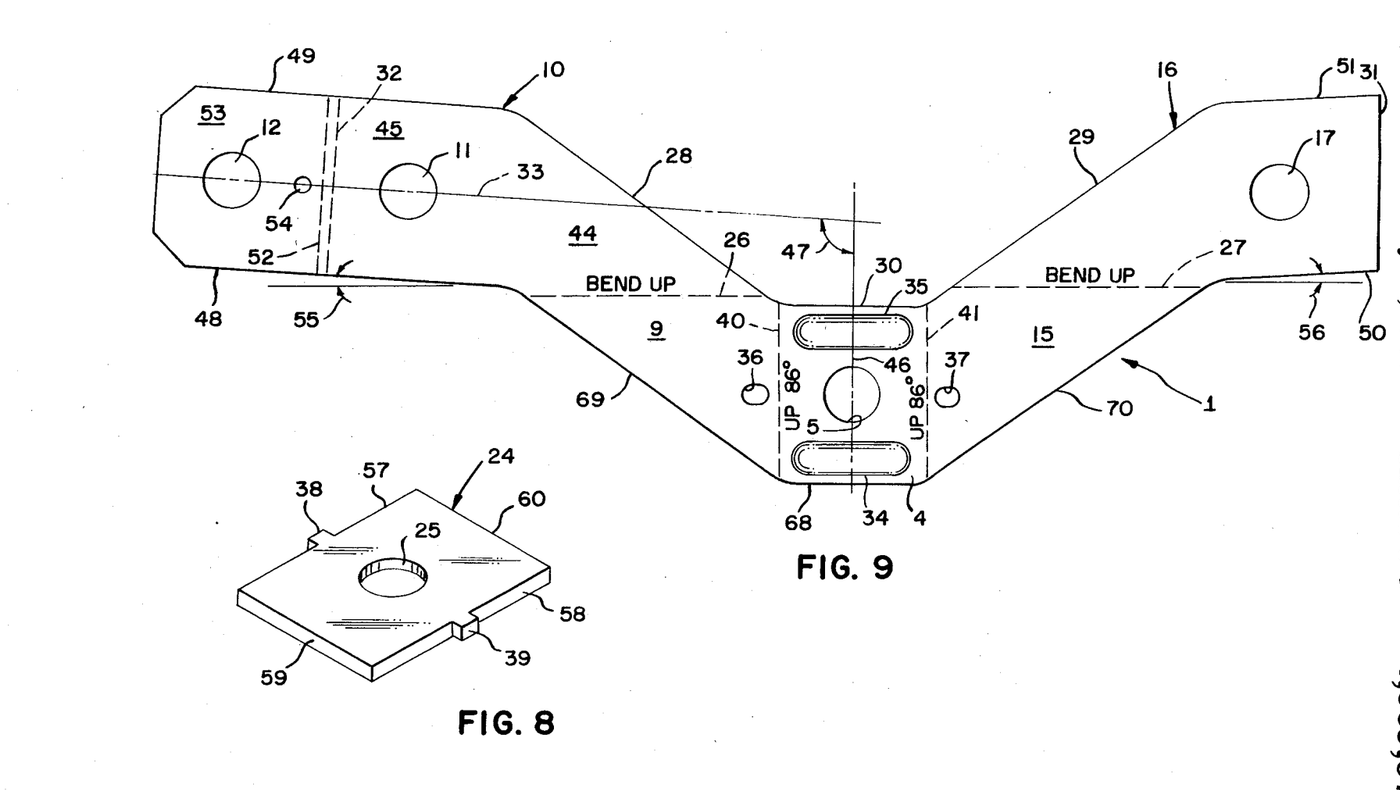
FIG. 8 is a perspective view of the washer used with the holdown of FIG. 1.
FIG. 9 is a plan view of the holdown of FIG. 1 prior to bending into its shape.
Figure 10:
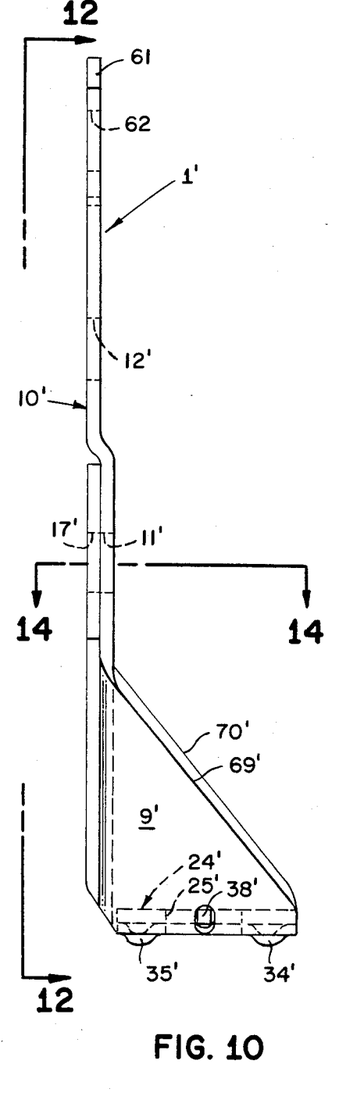
FIG. 10 is a side elevation view of another form of the invention.

A feature of the present invention is the use of a rectangular shaped washer 24 which is shown in detail in FIG. 8. The washer is formed with a circular opening 25. The washer is substantially rigid and is dimensioned for receipt between the side members of the connector. The washer operates in the standard way in preventing threaded nut 18 from being drawn through opening 5 in the seat member. Additionally, however, washer 24 is formed and dimensioned to cover substantially the entire area of the seat member so that during the application of uplift forces on the holdown exerted by earthquake or hurricane forces acting on the studs, the rectangular washer assists in preventing bending of the seat of the connector thereby preventing deformation of openings 5 and 25 and failure of the holdown by pullout of the bolt.

Figure 3:
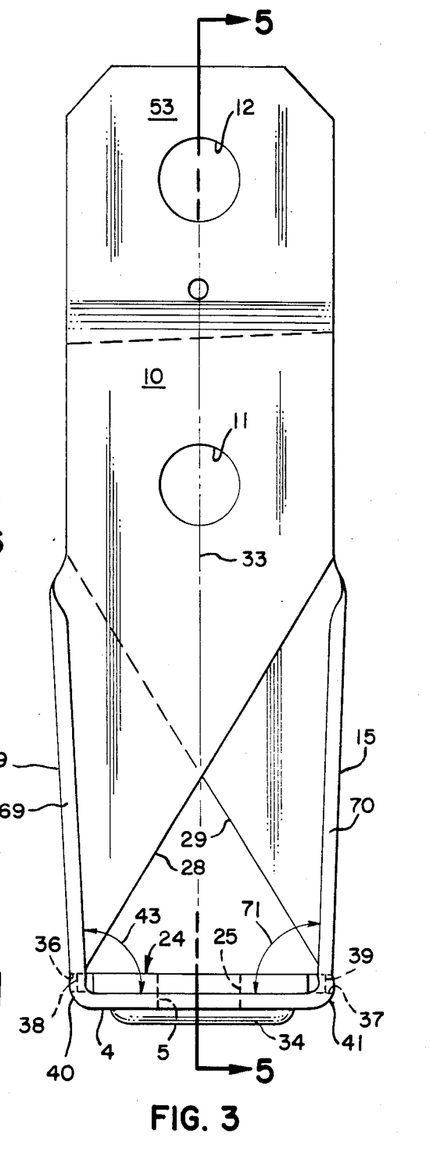
FIG. 3 is a front elevation view of the holdown of FIG. 1.
Figure 5:
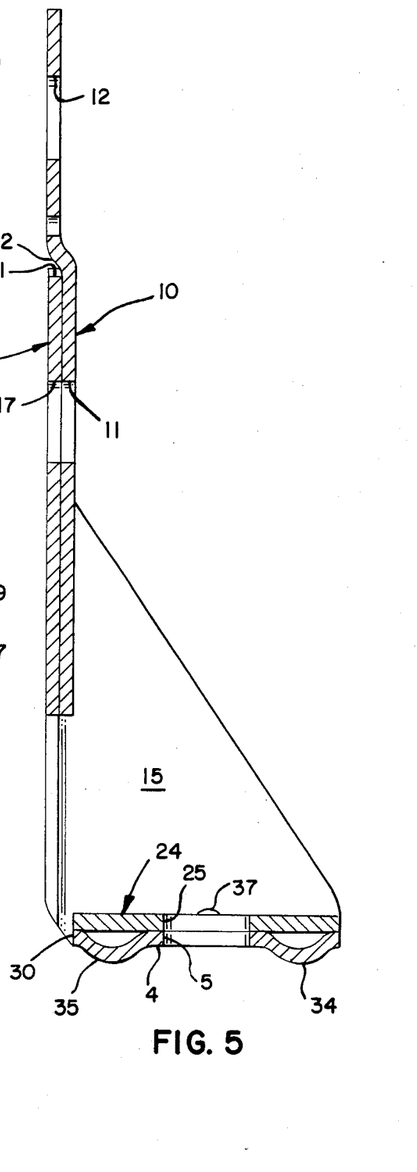
FIG. 5 is a cross sectional view of the holdown of FIG. 3 taken along line 5—5 of FIG. 3.

As shown in FIGS. 1, 3 and 5, the first and second back members are formed to provide a substantial opening adjacent the seat area and substantially in the plane of the back members. This opening is created by bending the back members along lines 26 and 27 and is bounded by side edges 28 and 29 and the back edge 30 of the seat.

Figure 4:
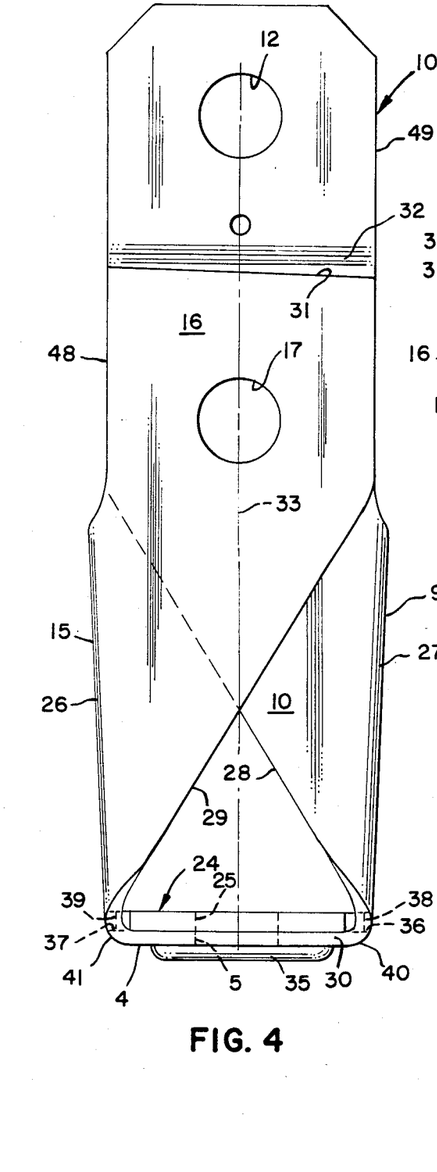
FIG. 4 is a rear elevation view of the holdown of FIG. 1 taken along line 4—4 of FIG. 2.

Referring to FIG. 4, the second back member terminates along an end line 31. The first back member is formed with an offset 32 along a line in registration with at least a portion of the end line of the second back member forming a mechanical locking engagement against relative rotation about an axis 33 through the aligned opening 11 and 17 in the first and second back members.

Preferably the holdown is constructed with a seat member which is formed with a pair of embossments 34 and 35 which depend in a direction toward the concrete foundation and are spaced on opposite sides of the opening in the seat member and extend from the first to the second side in generally parallel arrangement. Not only do the embossments give added stiffness to the seat, but they also provide added height to the holdown to comply with the code required height of the first bolt.

A unique feature of the present invention is the provision of openings or indents 36 and 37 in first and second side members adjacent the seat member. The washer member 24 is formed with protrusions 38 and 39 for locking registration with the openings in the first and second side members.

The connector is formed from light gauge galvanized sheet metal. For example, the holdown illustrated in FIG. 1 is formed from galvanized 10 gauge sheet metal. This permits the holdown to be made on standard machinery common in the sheetmetal connector industry. More importantly, there is no welding operation required nor does the holdown need to be painted. The washer material may be constructed from 3 gauge galvanized sheetmetal.

The holdown illustrated in FIG. 1-9 is constructed in a special manner so that it achieves greater holdown loads. A unique characteristic of this construction is the fact that the sides of the holdown taper outwardly as may be seen in FIGS. 3 and 4. The specific construction of this holdown is described as follows. Seat member 4 is formed with first and second side edges 40 and 41. First side member 9 having a front edge 69 is integrally connected to side edge 40 of the seat member and forms a first selected angle as indicated by double arrow line 43 in FIG. 3 which is greater than 90° so that side 9 tapers outwardly and upwardly. This angle in the holdown illustrated is 92½°. First back member 10 is integrally connected to first side member 9 along line 26 at an angle of substantially 90° and is formed with first and second openings 11 and 12 which are formed along a center line 33. The first back member 10 includes a lower portion 44 which is attached to the first side member 9 and an upper portion 45 which extends beyond the first side member. The first and second openings are formed in the upper portion of the first back member and the center line 33 of the first and second openings is oriented with respect to the centerline 46 of the seat opening so as to form a second selected angle 47 on the sheet metal blank which is substantially equal to said first selected angle. As shown in FIG. 9, angle 47 equals about 92½ degrees. A second side member 15 having a first edge 70 is integrally connected to the seat member along second side edge 41 of the seat member and forms an angle 71 therewith generally equal to the first selected angle. A second back member 16 is integrally connected to the second side member and forms a substantially right angle therewith. The second back member is substantially parallel and closely adjacent to the first back member and is formed with at least one opening 17 adapted for receiving one of the attachment members. The opening in the second back member is positioned in registration with the first opening in the first back member.

In forming the blank as shown in FIG. 9, side edges 48 and 49 should be cut at an angle of about $2\frac{1}{2}°$ with respect to bend line 26 and side edges 50 and 51 should be cut at an angle of about $2\frac{1}{2}°$ with respect to bend line 26 and side edges 50 and 51 should be cut at an angle of about $2\frac{1}{2}°$ with respect to bend line 27.

Figure 2:
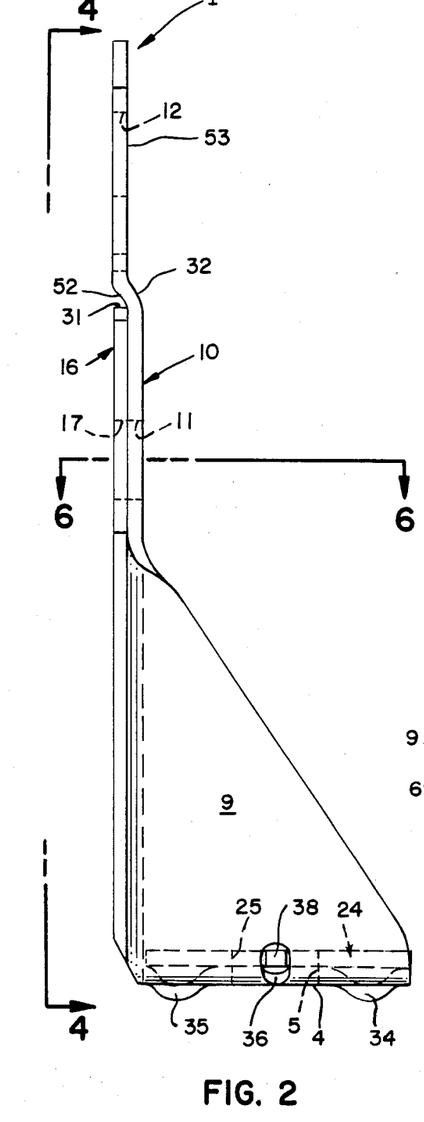
FIG. 2 is a side elevation view of the holdown of FIG. 1.

Referring to FIGS. 9 and 2, first back member 10 should be bent at approximately 45° along lines 32 and 52 so that back member 16 and extension member 53 of first back member 10 will lie in the same plane for flush mounting against a stud member.

Construction of the holdown member illustrated in FIGS. 1-9 is as follows. A strip of 12 gauge galvanized sheetmetal approximately 15 3/16" wide is placed in a progressive die and the individual blanks are cut as illustrated in FIG. 9. Holes 5, 11, 12, 17, 36 and 37 are punched. A nail opening 54 may also be punched in the back member for receipt of a 16d nail. A 45° bend down is made along bend line 32 and a 45° bend up is made along bend line 52. Bends of 86° up are made along lines 40 and 41 and bends of 90° are made along lines 26 and 27. In order to have openings 11 and 17 register, back members 10 and 16 are cut so that side edges 48, 49, 50 and 51 are cut so as to form an angle of about $2\frac{1}{2}°$ with bend lines 26 and 27. These angles are shown as angles 55 and 56 on FIG. 9.

The rectangular washer 24 with parallel edges 57 and 58 and parallel front and back edges 59 and 60 is assembled with the holdown at the factory by forcing the washer onto seat 4 so that protrusions 38 and 39 register with openings 36 and 37.

The holdown and washer is installed in the field by workmen as illustrated in FIG. 7. An anchor bolt 6 is embedded in the concrete foundation 3 either by placing it in the wet concrete or by drilling and setting the bolt after the foundation is poured. The upper end 7 of the bolt is inserted through opening 5 in the seat and opening 25 in the washer. A 16d nail is driven through opening 54 into stud 2 to temporarily hold the holdown while bolt holes are drilled through the stud at the proper elevation. Bolts 13 and 14 are then placed through the bolt openings and nuts 19 and 20 threaded on. A nut 18 is then placed on threaded end 7 and tightened down. Nut 7 should be rotated until embossments 34 and 35 are slightly embedded in the mudsill. This will insure that a slight shrinkage of the wood will not result in loosening the holdown.

FIGS. 10-16 illustrates another form of the invention. Because of the obvious similarities between the holdown illustrated in FIGS. 1-9, like numbers have been used to identify similar parts and are distinguished only by the prime symbol ('). Where a similar part does not exist, a new number has been assigned. It is believed unnecessary to completely repeat the description except to point out those areas that are different.

The holdown of FIGS. 10-16 is for use with heavier structural members and accordingly is made from 3 gauge material and from a metal strip $25\frac{3}{8}$ inches wide. The most visible difference is the addition of an extra length of material 61 and the addition of a third hole 62. This third opening receives a third attachment member 63 which is formed with threads 64 for the receipt of nut 65. This form of the invention is also provided with a factory attached washer 24' which may be cut from 3 gauge material.

Figure 11:
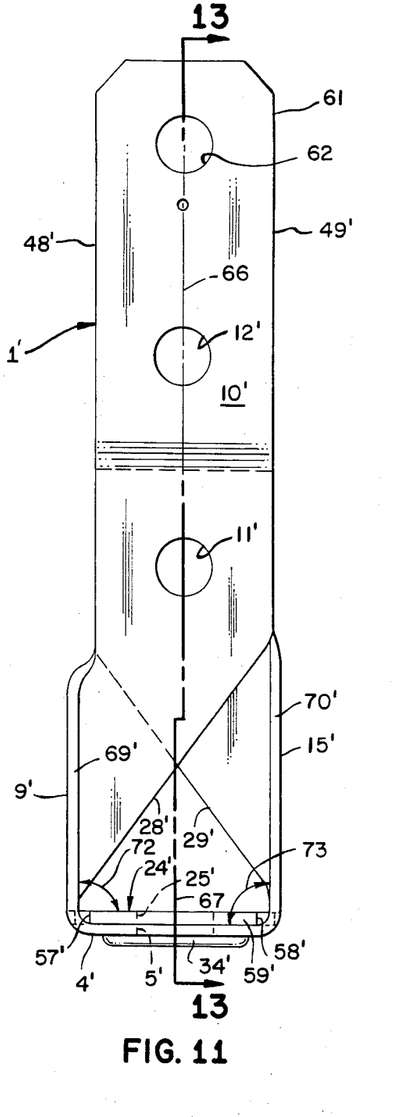
FIG. 11 is a front elevation view of the holdown illustrated in FIG. 10.
Figure 12:
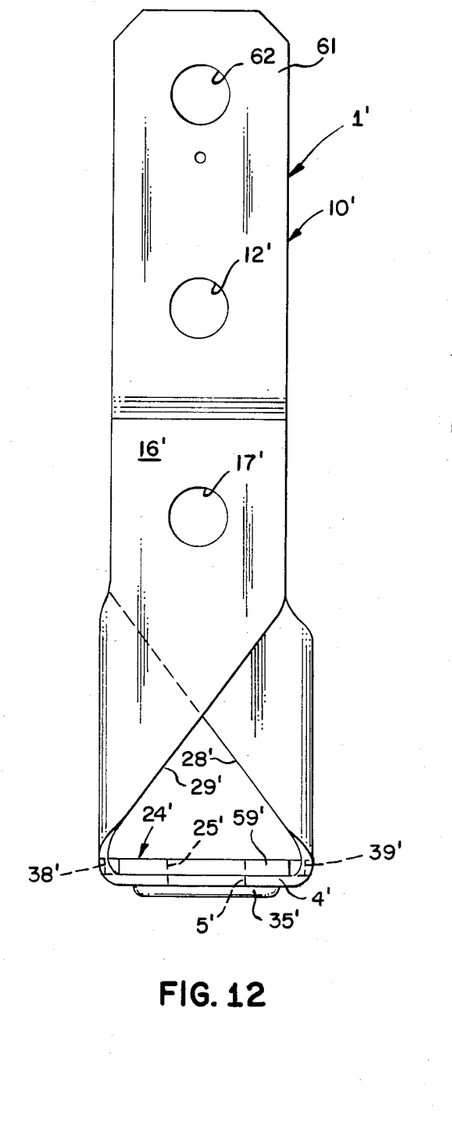
FIG. 12 is a rear elevation view of the holdown illustrated in FIG. 10.
Figure 13:
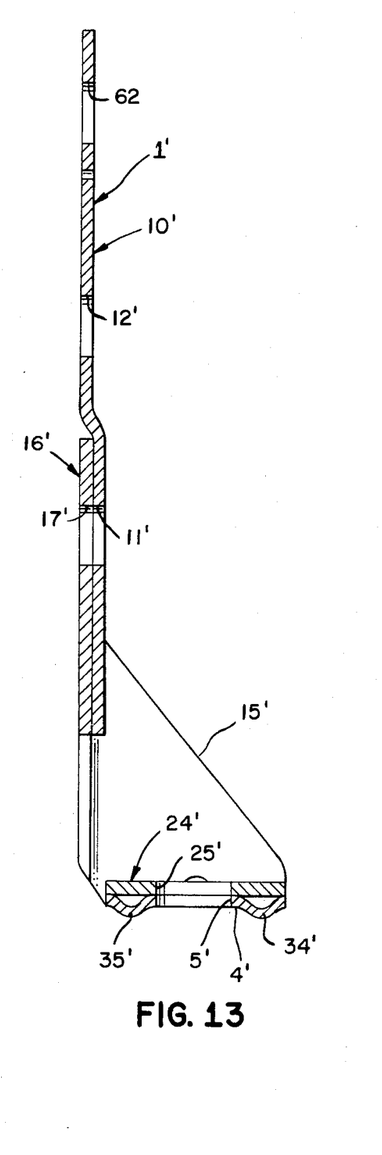
FIG. 13 is is a cross sectional view of the holdown shown in FIG. 11 taken generally along line 13—13.
Figures 14, 15:
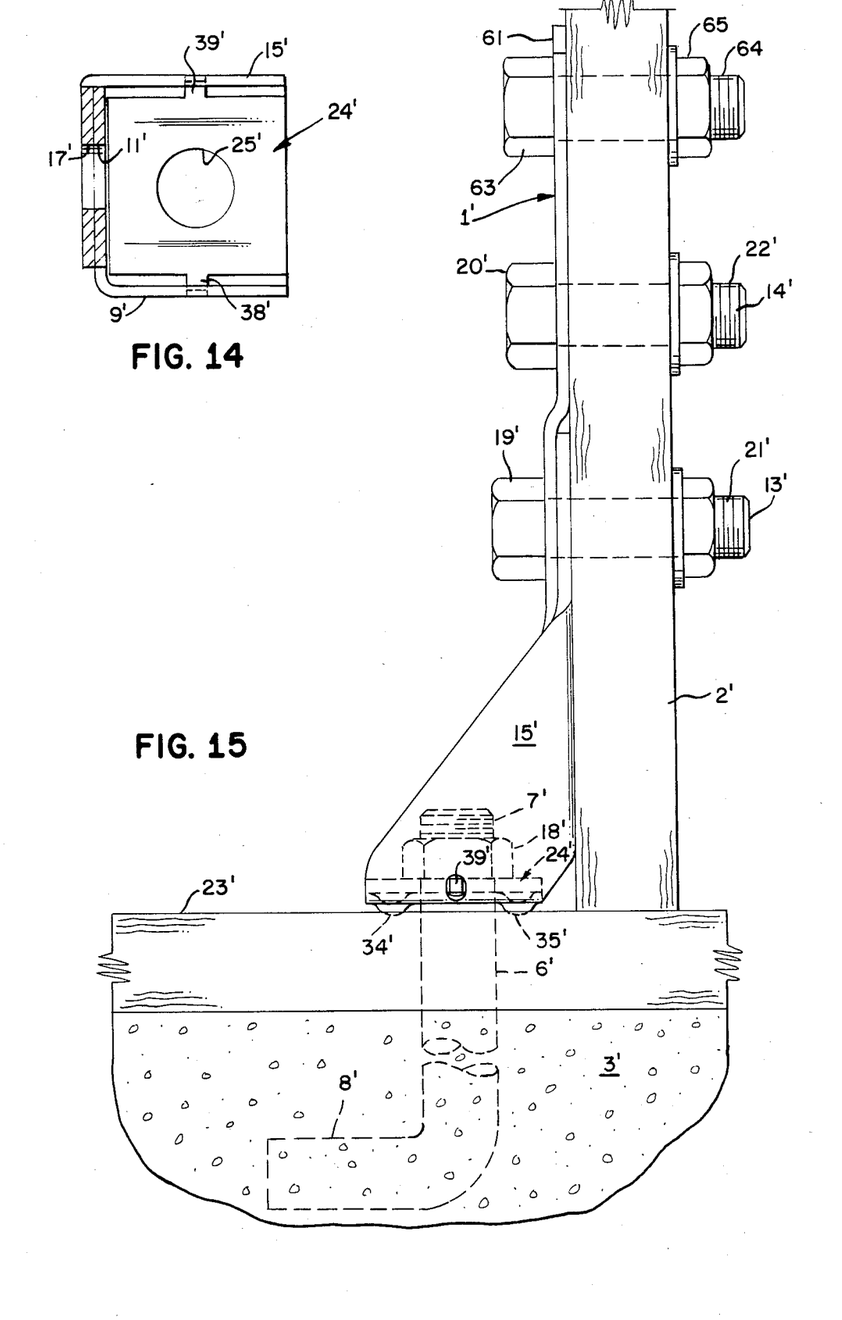
FIG. 14 is a cross sectional view of the holdown illustrated in FIG. 10 taken generally along line 14—14.
FIG. 15 is a side elevation view of the holdown illustrated in FIG. 10. A portion of a foundation, mudsill and stud are shown to illustrate an installation of the holdown.
Figure 16:
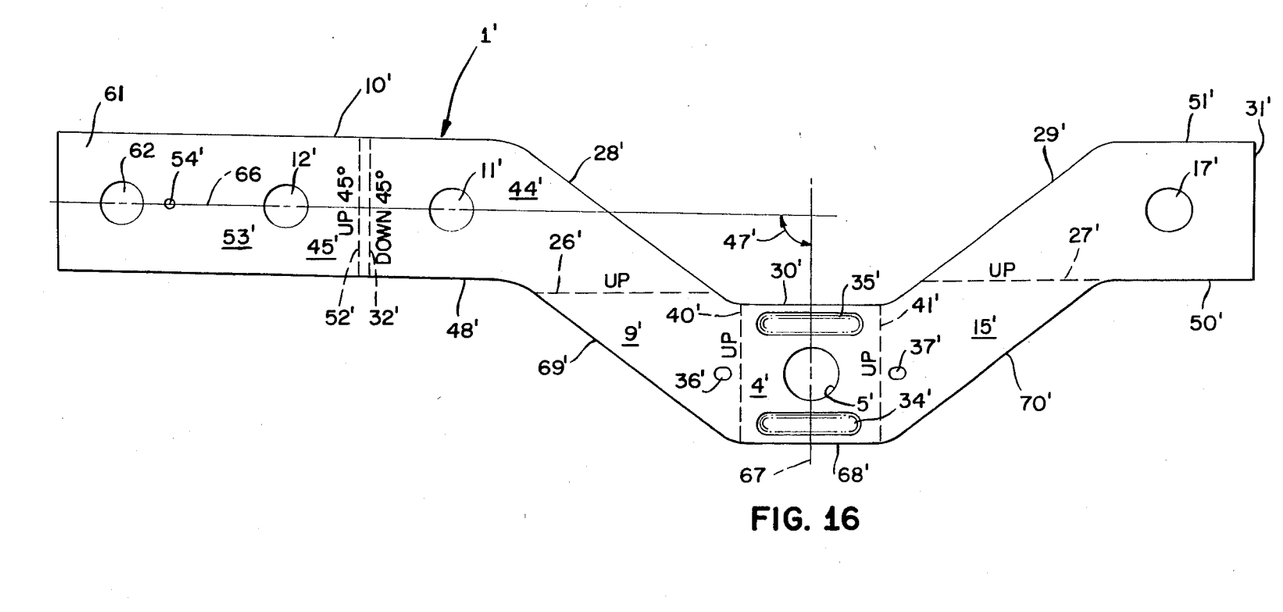
FIG. 16 is a plan view of the holdown of FIG. 10 shown on a reduced scale illustrating the sheet metal blank after cutting but before bending.

It may be noted that side members 9' and 15' are bent along lines 40' and 41' upwardly at an approximately 90° angle. Also, edges 48' and 50' of the back members are parallel to bend lines 26' and 27' which are bent at a 90° angle. This configuration as shown in FIGS. 11 causes the center line 66 of the three holes in the back member to be offset slightly from the center line 67 of the hole in the base. As shown in FIG. 11, sides 9' and 15' are parallel rather than tapered and extend upwardly at 90° angles 72 and 73 from the base. As shown in FIG. 11, side edge 48' is offset slightly from side edge 9'. Construction of the holdown of FIGS. 10-16 is identical to the holdown of FIGS. 1-9 except for the changes indicated. Fabrication and use are similar and not repeated.

Load tests conducted on most holdowns of the present invention show an increase in load of 10% to about 36% with a 25% to 48% decrease in metal weight. Because welding and painting are eliminated, there is an additional substantial decrease in manufacturing costs. There is a savings in installation costs since the washer is preattached at the factory and there is no need to measure the seat height from the sill member as was required in some prior art holdowns.

We claim:

1. A non-welded sheet metal holdown connector contructed from a single member and formed by bending along substantially straight bend lines for holding a wood frame member subject to a design load in tension to a building member by a tension attachment member, said connector comprising:
   a. a continuous seat member formed with opening adapted for receipt therethrough of said tension attachment member anchored to said building member;
   b. a first member integrally connected to a first portion of said seat member and forming a generally right angle therewith;
   c. first and second attachment members adapted for connection to said wood frame member;
   d. a first back member having a length substantially greater than the length of said seat integrally connected to said first side member and forming a generally right angle therewith and formed with spaced openings adapted for receipt therethrough of said first and second attachment members;
   e. a second side member integrally connected to a second portion of said seat member disposed on opposite sides of said seat opening and forming a generally right angle to said seat member, and said second side member is generally parallel to said first side member;
   f. a second back member having a length substantially greater than the length of said seat member and integrally connected to said second side member and forming a generally right angle therewith, and said second back member is substantially parallel and closely adjacent to said first back member, and is formed with at least one opening adapted for receiving said first attachment member, and at least a portion of said second back member overlaps a portion of said first back member wherein said opening in said overlapping portion of said second back member is in alignment with at least one of said openings in said first back member; and g. said first attachment member holds said first and second back members together and transfers said design load in shear substantially evenly to said first and second overlapped back members.

2. A holdown connector as described in claim 1 wherein:

a. said openings in said first and second back members are circular in shape and said attachment members are circular in shape and are sized for close registration with said openings.

3. A holdown connector as described in claim 2 comprising:

a. said seat member has a generally rectangular shape; and b. a substantially rigid washer member dimensioned for face to face registration with said seat member, dimensioned for receipt between said side members and formed with an opening therethrough adapted for receipt of said attachment member anchored to said building member.

4. A holdown connector as described in claim 3 wherein:

a. said washer member is substantially equal in area and configuration to said seat member.

5. A holdown connector as described in claim 1 wherein:

a. said first and second back members are formed to provide a substantial opening adjacent said seat member and substantially in the plane of said back members.

6. A holdown connector as described in claim 1 wherein:

a. said seat member is formed with a pair of embossments depending in a direction toward said building member, spaced on opposite sides of said opening in said seat member and extending from said first to said second side in generally parallel arrangement.

7. A holdown as described in claim 1 comprising:

a. said connector is formed from a heavier gauge material for withstanding greater forces; and b. a back extension member integrally connected to said first back member and formed with an opening therethrough adapted for receipt of a third attachment member.

8. A holdown as described in claim 7 comprising:

a. a substantially rigid washer member dimensioned for face to face registration with said seat member, dimensioned for receipt between said side members and formed with an opening therethrough adapted for receipt of said attachment member anchored to said building member; and b. said washer member is substantially equal in area and configuration to said seat member.

9. A sheetmetal holdown connector for holding a wood frame member in tension to a building member comprising:

a. a seat member formed with an opening adapted for receipt therethrough of a tension attachment member anchored to said building member;

b. a first side member integrally connected to said seat member and forming a generally right angle therewith;

c. a first back member integrally connected to said first side member and forming a generally right angle therewith and formed with spaced openings adapted for receipt therethrough of first and second attachment members adapted for connection to said frame member;

d. a second side member integrally connected to said seat member and forming a generally right angle therewith and said second side member is generally parallel to said first side member;

e. a second back member integrally connected to said second side member and forming a generally right angle therewith, and said second back member is substantially parallel and closely adjacent to said first back member, and is formed with at least one opening adapted for receiving one of said attachment members, and at least a portion of said second back member overlaps a portion of said first back member wherein said opening in said overlapping portion of said second back member is in alignment with at least one of said openings in said first back member.

f. said second back member terminates along an end line; and g. said first back member is formed with an offset along a line in registration with at least a portion of said end line of said second back member forming a mechanical locking engagement against relative rotation about an axis through said aligned openings in said first and second back members.

10. A wood-to concrete structural holdown connector formed by bending along substantially straight bend lines from a non-welded, single member sheetmetal blank for joining a wood upstanding frame member subject to a design load in tension to a concrete foundation comprising:

a a continous seat member having first and second side edges and formed with an opening on a centerline parallel with said side edges adapted for receipt therethrough of a tension attachment member anchored in said concrete foundation;

b. a first side member integrally connected to said first side edge of said seat member and forming a first selected angle therewith greater than 90° so as to taper outwardly;

c. first and second attachment members adapted for connection to said upstanding frame member;

d. a first back member having a length substantially greater than the length of said seat member and integrally connected to said first side member and forming a generally right angle therewith and formed with spaced first and second openings formed along a centerline and adapted for receipt therethrough of said first and second attachment member;

e. said first back member includes a lower portion which is attached to said first side member and an upper portion which extends beyond said first side member;

f. said first and second openings are formed in said upper portion of said first back member and said center line of said first and second openings is oriented with respect to said centerline of said seat opening so as to form a second selected angle on said sheet metal blank which is substantially equal to said first selected angle;

g. a second side member integrally connected to said seat member along said second side edge of said seat member and forming an angle therewith generally equal to said first selected angle;

h. a second back member having a length substantially greater than the length of said seat member and integrally connected to said second side member and forming a generally right angle therewith, and said second back member is substantially parallel and closely adjacent to said first back member, and is formed with at least one opening adapted for receiving said first attachment member, and at least a portion of said second back member overlaps a portion of said first back member wherein said opening in said overlapping portion of said second back member is positioned in registration with at least said first opening in said first back member and i. said first attachment member holds said first and second back members together and transfers said design load in shear substantially evenly to said first and second overlapped back members.

11. A sheet metal wood-to-concrete structural holdown connector for joining a wood upstanding frame member to a concrete foundation comprising:

a. a seat member formed with an opening adapted for receipt therethrough of an attachment member anchored in said concrete foundation;

b. a first side member integrally connected to said seat member and forming a generally right angle therewith;

c. a first back member integrally connected to said first side member and forming a generally right angle therewith and formed with spaced openings adapted for receipt therethrough of first and second attachment members adapted for connection to said frame member;

d. a second side member integrally connected to said seat member and forming a generally right angle therewith, and said second side member is generally parallel to said first side member;

e. a second back member integrally connected to said second side member and forming a generally right angle therewith, and said second back member is substantially parallel and closely adjacent to said first back member, and is formed with at least one opening adapted for receiving one of said attachment members, and at least a portion of said second back member overlaps a portion of said first back member wherein said opening in said overlapping portion of said second back member is in alignment with one of said openings in said first back member;

f. said openings in said first and second back members are circular in shape and said attachment members are circular in shape and are sized for close registration with said openings;

g. said seat member has a generally rectangular shape;

h. a substantially rigid washer member dimensioned for face to face registration with said seat member, dimensioned for receipt between said side members and formed with an opening therethrough adapted for receipt of said attachment member anchored to said foundation;

i. said washer member is substantially equal in area and configuration to said seat member;

j. said first and second side members are formed with openings adjacent said seat member; and k. said washer member is formed with protrusions dimensioned and positioned for locking registration with said openings in said first and second side members.

12. A holdown as described in claim 11 wherein:

a. said connector is formed from light gauge galvanized sheet metal.

13. A sheet metal wood-to-concrete structural holdown connector for joining a wood upstanding frame member to a concrete foundation comprising:

a. a seat member formed with an opening adapted for receipt therethrough of an attachment member anchored in said concrete foundation;

b. a first side member integrally connected to said seat member and forming a generally right angle therewith;

c. a first back member integrally connected to said first side member and forming a generally right angle therewith and formed with spaced openings adapted for receipt therethrough of first and second attachment members adapted for connection to said frame member;

d. a second side member integrally connected to said seat member and forming a generally right angle therewith, and said second side member is generally parallel to said first side member;

e. a second back member integrally connected to said second side member and forming a generallly right angle therewith, and said second back member is substantially parallel and closely adjacent to said first back member, and is formed with at least one opening adapted for receiving one of said attachment members, and at least a portion of said second back member overlaps a portion of said first back member wherein said opening in said overlapping portion of said second back member is in alignment with one of said openings in said first back member;

f. said connector is formed from a heavy gauge material for withstanding large forces;

g. a back extension member integrally connected to said first back member and formed with an opening therethrough adapted for receipt of a third attachment member;

h. a rectangular washer member having an area substantially equal dimensionally and in configuration to said seat member;

i. locking means formed in said washer; and j. latch means formed in said side member adjacent said seat member for locking attachment of said washer to said seat member.

14. A sheet wood-to-concrete structural holdown connector for joining a wood upstanding frame member to a concrete foundation comprising:

a. a seat member formed with an opening adapted for receipt therethrough of an attachment member anchored in said concrete foundation;

b. a first side member integrally connected to said seat member and forming a generally right angle therewith;

c. a first back member integrally connected to said first side member and forming a generally right angle therewith and formed with spaced openings adapted for receipt therethrough of first and second attachment members adapted for connection to said frame member;

d. a second side member integrally connected to said seat member and forming a generally right angle therewith, and said second side member is generally parallel to said first side member;

e. a second back member integrally connected to said second side member and forming a generally right angle therewith, and said second back member is substantially parallel and closely adjacent to said first back member, and is formed with at least one opening adapted for receiving one of said attachment member, and at least a portion of said second back member overlaps a portion of said first back member wherein said opening in said overlapping portion of said second back member is in alignment with one of said openings in said first back member;

f. said connector is formed from a heavy gauge material for withstanding large forces;

g. a back extension member integrally connected to said first back member and formed with an opening therethrough adapted for receipt of a third attachment member;

h. a substantially rigid washer member dimensioned for face to face registration with said seat member, dimensioned for receipt between said side members and formed with an opening therethrough adapted for receipt of said attachment member anchored to said foundation;

i. said washer member is substantially equal in area and configuration to said seat member;

j. said rectangular washer member is formed with a pair of parallel side edges and protrusions extending outwardly from each of said side edges;

k. said latch means includes a pair of openings formed in said side members for registration with said protrusions; and l. said seat member is formed with a pair of parallel embossments spaced on oposite sides of said opening in said seat member and extending from said first to said second side in generally parallel arrangement.

15. In a wood frame and concrete foundation structure, the connection for resisting uplift forces acting on said wood frame comprising:

a. a concrete foundation member having a generally planar top surface;

b. an elongated generally horizontally extending wood mudsill member having generally planar upper and lower sides with said lower side disposed in face to face contact with said upper surface of said concrete foundation member;

c. an elongated generally vertically extending wood stud member having an end in registration with said upper side of said mudsill member and having an elongated side disposed at a generally right angle to said mudsill member and subject to said uplift force acting in an assumed design loading upwardly parallel to said wood stud member;

d. an anchor bolt emedded in said concrete foundation and having an end protruding above said upper surface of said concrete foundation member and disposed through said mudsill member;

e. a non-welded sheet metal holdown connector constructed from a single planar sheet metal nonstretched member formed by bending along substantially straight bend lines including:

(1) a continuous seat member formed with an opening adapted for receipt therethrough of said protruding end of said anchor bolt;

(2) a first side member integrally connected to said seat member and forming a generally right angle therewith;

(3) a first back member having a length substantially greater than the length of said seat member and integrally connected to said first side member and forming a generally right angle therewith and formed with first and second longitudinally spaced openings located at a selected distance from said upper side of said mudsill;

(4) a second side member integrally connected to said seat member and forming a generally right angle therewith, and said second side member is generally parallel to said first side member; and (5) a second back member having a length substantially greater than the length of said seat member and integrally connected to said second side member and forming a generally right angle therewith, and said second back member is substantially parallel and closely adjacent to said first back member and at least a portion of said second back member overlaps a portion of said first back member, and said overlapping portion of said second back member is formed with at least one opening in alignment with one of said openings in said first back member;

f. a first attachment member inserted through said first opening in said first back member and said opening in said second back member connecting said holdown connector to said wood stud member and for holding said first and second back members together and for evenly transferring said design loading in shear to said first and second overlapped back members;

g. a second attachment member inserted through said second opening in said first back member and into said wood stud member; and h. clamping means connected to said protruding end of said anchor bolt connecting said seat member of said holdown connector to said mudsill and said foundation.

16. In a wood frame building structure, the connection resisting tension forces acting on said frame and comprising:

a. a first elongated wood structural member having a generally planar face and subject to said tension force acting in an assumed design loading generally parallel to said elongated wood stuctural member;

b. a second structural member disposed from said first structural member;

c. a third structural member disposed between and contacting said first and second structural members;

d. a tension member held by said second structural member and having an end protruding through said third stuctural member;

e. a non-welded sheet metal holdown connector constructed from a single planar sheet metal member formed by bending along substantially straight bend lines including:

(1) a continuous seat member formed with an opening adapted for receipt therethrough of said protruding end of said tension member;

(2) a first side member integrally connected to said seat member and forming a generally right angle therewith;

(3) a first back member having a length substantially greater than the length of said seat member and integrally connected to said first side member and forming a generally right angle therewith and formed with first and second longitudinally spaced openings located at a selected distance from said third structural member;

(4) a second side member integrally connected to said seat member and forming a generally right angle therewith, and said second side member is generally parallel to said first side member; and (5) a second back member having a length substantially greater than the length of said seat member and integrally connected to said second side member and forming a generally right angle therewith, and said second back member is substantially parallel and closely adjacent to said first back member and at least a portion of said second back member overlaps a portion of said first back member, and said overlapping portion is formed with at least one opening in alignment with one of said openings in said first back member;

f. a first attachment member inserted through said first opening in said first back member and said opening in said second back member connecting said holdown connector to said first wood structural member for joining said first and second back members together and for evenly transferring said design loading in shear to said first and second overlapped back members;

g. a second attachment member inserted through said second opening in said first back member and into said first elongated wood structural member; and h. clamping means connected to said protruding end of said tension member connecting said seat member of said holdown connector to said second structural member.

17. A one piece, non-welded sheet metal holdown connector fastened to an elongated wood frame member subject to an assumed design loading force acting parallel to said elongated wood frame member by first and second attachment members and held to a remote building member by a tension member and which is separated from said remote building member by a compression structural member having a generally planar face, said holdown comprising:

a. a continuous seat member formed with an opening adapted for receipt therethrough of said tension member and having a face side adapted for registered compressive contact with said planar face of said compression structural member;

b. a first side member integrally connected to said seat member and forming a generally right or greater angle therewith;

c. a first back member having a length substantially greater than the length of said seat member and integrally connected to said first side member and forming a generally right angle therewith and formed with spaced openings adapted for receipt therethrough of said first and second attachment members adapted for connection to said wood frame member;

d. a second side member integrally connected to said seat member and forming a generally right or greater angle therewith, and said second side member is generally parallel or forms a diverging relationship to said first side member;

e. a second back member having a length substantially greater than the length of said seat member and integrally connected to said second side member and forming a generally right angle therewith, and said second back member is substantially parallel and closely adjacent to said first back member, and is formed with at least one opening adapted for receiving one of said attachment members, and at least a portion of said second back member overlaps a portion of said first back member wherein said opening in said overlapping portion of said second back member is in alignment with at least one of said openings in said first back member and f. at least one of said attachment members inserted through said opening in said second back member and said opening in said overlapped portion of said first back member holds said back portions together and evenly transfers said design loading in shear to said first and second overlapped members.

* * * * *

UNITED STATES PATENT AND TRADEMARK OFFICE
CERTIFICATE OF CORRECTION

PATENT NO. : 4,665,672
DATED : May 19, 1987
INVENTOR(S) : Alfred D. Commins, Tyrell T. Gilb and Karen W. Littleton It is certified that error appears in the above-identified patent and that said Letters Patent is hereby corrected as shown below:

Face page, [73] Assignee delete "Alameda" and insert ---San Leandro---

Column 2, line 41, after "into its" insert ---final---

Column 6, line 41, after "formed with" insert ---an---

Column 6, line 45, before "member" insert ---side---

Column 8, line 58, delete "member" insert ---members---

Column 11, line 11, delete "member" insert ---members---

Signed and Sealed this

Sixth Day of October, 1987

Attest:

DONALD J. QUIGG

Attesting Officer

Commissioner of Patents and Trademarks